(12) United States Patent
Nygaard, Jr. et al.

(10) Patent No.: US 6,768,703 B2
(45) Date of Patent: Jul. 27, 2004

(54) EYE DIAGRAM ANALYZER WITH FIXED DATA CHANNEL DELAYS AND SWEPT CLOCK CHANNEL DELAY

(75) Inventors: Richard A Nygaard, Jr., Colorado Springs, CO (US); David D. Eskeldson, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 281 days.

(21) Appl. No.: 10/132,609

(22) Filed: Apr. 25, 2002

(65) Prior Publication Data

US 2003/0202427 A1 Oct. 30, 2003

(51) Int. Cl.$^7$ .......................... G04B 47/00; G09G 5/00; G06T 11/20; G06F 19/00; G01R 29/02
(52) U.S. Cl. ..................... 368/10; 345/208; 345/440; 702/73; 702/79; 702/80
(58) Field of Search ................................ 345/208, 418, 345/419, 440; 324/76.12, 76.19, 76.22; 702/66, 67, 69–73, 79, 87

(56) References Cited

U.S. PATENT DOCUMENTS

| | | | | |
|---|---|---|---|---|
| 5,343,405 A | * | 8/1994 | Kucera et al. ................. | 702/73 |
| 5,414,713 A | * | 5/1995 | Waschura et al. ............ | 714/715 |
| 5,771,242 A | * | 6/1998 | Adams et al. ................ | 714/738 |
| 5,999,163 A | * | 12/1999 | Ivers et al. ................... | 345/208 |
| 6,366,374 B2 | * | 4/2002 | Bradshaw et al. ............ | 398/17 |
| 6,385,252 B1 | * | 5/2002 | Gradl et al. .................. | 375/257 |
| 6,614,434 B1 | * | 9/2003 | Finke .......................... | 345/440 |

FOREIGN PATENT DOCUMENTS

EP    1143654    * 10/2001

OTHER PUBLICATIONS

Madhavan, B. et al "GB/s/cm Data Bandwidth Density Interface in .05 micrometer CMOS for Advanced Optical Interconnects", 1998 Electronic Letters. vol. 34, pp. 1846–1847.*

* cited by examiner

Primary Examiner—Vit W. Miska
(74) Attorney, Agent, or Firm—Edward L. Miller

(57) ABSTRACT

Delay induced apparent amplitude desensitization in a data signal channel and its accompanying worm-like distortion in an Eye Diagram Analyzer is avoided by altering the measurement to avoid the need for any substantial delay in the path of the data channel threshold comparison signals. In a first technique, only enough delay will be inserted in the data channels to produce the relative adjustments needed to compensate for skew between the data channels, as determined by a calibration operation, and it is these de-skewed, but otherwise un-delayed, data threshold comparison signals that are, in rapid succession, clocked into the latches whose difference registers a hit at a given (time, voltage) pair. The clock path delay is then varied from a minimal value to a sufficiently large value capable of spanning a desired the number of eye diagram cycles. In a second technique, the needed amounts of de-skew delay found by the calibration operation are noted, and then the actual delays in the data path are set back to zero. The clock path delay is swept as in the first technique. The de-skewing operation is then performed in post-processing that produces the eye diagram after the measurement is complete. In either technique, the short width of transitions in the data threshold comparison signals that are associated with threshold values near the extremes of data signal excursion are no longer swallowed by the finite bandwidth of a long delay line, since the delay lines in the data channel paths now either introduce only just enough delay to compensate for skew (and those amounts are very short), or, do not introduce any extra delay at all.

4 Claims, 3 Drawing Sheets

EYE DIAGRAM ANALYZER WITH FIXED DATA CHANNEL DELAYS AND SWEPT CLOCK CHANNEL DELAY

REFERENCE TO RELATED APPLICATION

The subject matter of the present Application pertains to the measurement of eye diagrams in general, and is especially well suited for use with one existing eye diagram measurement technique in particular. An implementation of that existing technique of interest is the subject matter of a U.S. patent application entitled METHOD AND APPARATUS FOR PERFORMING EYE DIAGRAM MEASUREMENTS bearing Ser. No. 10/020,673 which was filed on Oct. 29, 2001 by Richard A. Nygaard, Jr. and assigned to Agilent Technologies, Inc. Because the subject matter of that Application is essentially a point of departure for the present invention, and for the sake of brevity, "METHOD AND APPARATUS FOR PERFORMING EYE DIAGRAM MEASUREMENTS" is hereby expressly incorporated herein by reference.

BACKGROUND OF THE INVENTION

Eye diagrams are a conventional format for representing parametric information about signals, and especially digital signals. Various prior art eye diagram testers are known, but we shall call the technique described in "METHOD AND APPARATUS FOR PERFORMING EYE DIAGRAM MEASUREMENTS", as well as the preferred method to be disclosed herein (and any corresponding circuit apparatus), an Eye Diagram Analyzer, or EDA for short.

A modern eye diagram for a digital signal is not so much a trace formed continuously in the time domain, as it is an "eye" shape composed of closely spaced points (displayed dots, or illuminated pixels) representing many individual measurement samples taken upon separate instances of a signal occurring on a channel of interest, and which were then stored in a memory. Each measurement sample contributes to a displayed dot. The eye shape appears continuous because the collection of dots is rather dense, owing to the large number of times that the signal is sampled. Unlike a true continuous technique, however, there may be detached dots that are separated from the main body of the eye shape. A further difference with the continuous analog technique is that rare or infrequently occurring events, once sampled, do not appear faint in the display or disappear with the persistence of the CRT's phosphor. This latter difference is often quite an advantage, since it is often the case that such otherwise "hard to see" features of the trace are very much of interest.

In any event, the vertical axis is voltage, and the horizontal axis represents the differences in time (i.e., various offsets) between some reference event and the locations for the measurement samples. The reference event is generally an edge of a clock signal in the system under test, represents directly or through some fixed delay the expected point in time when the value of an applied data signal would be captured by some receiving circuit in an SUT (System Under Test), and is derived from an application of the SUT's clock to the Eye Diagram Analyzer. The time axis will generally have enough length to depict one complete eye-shape (cycle of a SUT signal) centered about the reference, with sometimes perhaps several additional eyes (cycles) before and after.

Different (X, Y) regions within a (sample) space containing an eye diagram represent different combinations of time and voltage. Assume that the eye diagram is composed of a number of pixels, and temporarily assume that the resolution is such that each different (X, Y) pixel position can represent a different combination of time and voltage (and vice versa), which combinations of time and voltage we shall term "measurement points." What the Eye Diagram Analyzer measures is the number of times, out of a counted number of clock cycles, that the signal on the channel being monitored passed through a selected measurement point. Then another measurement point is selected, and the process repeated until there are enough measurement points for all the pixels needed for the display. Points along the visible eye diagram trace describe something about those (time, voltage) combinations that were observed to actually occur in the data signal under test. The value of a (time, voltage) combination is represented by its location, but the color or intensity of the measured result is determined in a way that assists in appreciating the meaning of the measured data. The range over which the measurement points are varied is called a "sample space" and is defined during a measurement set-up operation. And in reality, we define the sample space and the resolution for neighboring measurement points first, start the measurement and then let the analyzer figure out later how to ascribe values to the pixels of the display. The "display" is, of course, an arbitrary graphic output device such as a printer or an X Window of some as yet unknown size in a window manager (e.g., X11) for a computer operating system. (A one-to-one correspondence between display pixels and measurement points is not required. It will be appreciated that it is conventional for display systems, such as X Windows, to figure out how to ascribe values to the pixels for an image when the correspondence between the display's pixel locations and the measurements that are the original image description is not one-to-one.)

A modern eye diagram trace itself is thus not a single time domain waveform (think: 'single valued function'), but is instead equivalent to an accumulation of many such instances; it can present multiple voltage (Y axis) values for a given time value (X axis). So, for example, the upper left-hand region of an eye might represent the combination of an adequate logical one at an adequately early time relative to the SUT's clock signal, and an eye diagram whose trace passes robustly through that region indicates to us that a signal of interest is generally achieving a proper onset of voltage at a proper time. Furthermore, we note that there are also other regions, say, near the center of an eye, that are not ordinarily transited by the trace, and which if that were indeed to happen, would presumably be an indication of trouble. Thickening of the traces is indicative of jitter, a rounding of a corner is indicative of slow transitions, and so on. An eye diagram by itself cannot reveal in the time domain which isolated instance (cycle) of the data signal caused such an exception, as other types of measurements might, but it does provide timely and valid information about signal integrity within a system as it operates. In particular, by incorporating various rules for determining the intensity and color of the displayed pixels of the eye diagram trace (e.g., very long, perhaps "infinite", persistence) the eye diagram presents readily seen evidence of infrequently occurring failures or other hard to spot conditions.

The EDA of the incorporated "METHOD AND APPARATUS FOR PERFORMING EYE DIAGRAM MEASUREMENTS" operates by applying the clock signal from the SUT to a comparator circuit whose output is then delayed by a fixed amount, say about a half cycle, or some integral multiple thereof. The delayed clock comparison is then the reference mentioned above, and it used by determining when individually threshold-compared and then delayed data signals (the SUT data channels) are sampled.

This sampling of the individually threshold-compared and then delayed data signals is actually performed twice in rapid succession, a very brief (but selectable) amount of time apart. If these two successive samples are different, then the input signal transitioned through the voltage region of interest, and we call this a hit. This is the manner of sampling that accomplishes the taking of the (time, voltage) pairs that are the basic data of the eye diagram measurement, and it is an alternative to digitizing with a conventional Analog-to-Digital Converter (ADC). We use it because it works at frequencies that are impractical for ADCs.

Different sampling voltages are obtained by varying the comparison thresholds for the data signals. Different times are obtained by varying the amount of delay in the data channel path, while leaving the clock data signal path essentially fixed. Skew between data channels is removed by introducing corresponding increases or decreases in the individual delays of the data channels.

An advantage of this technique is that, once skew is calibrated out, it allows the delay and threshold comparison for each data channel to vary as needed to complete the measurement. That is, the EDA will dwell on a measurement point for say, a specified number of clocks, or say, until some other condition is met, before moving on to the next measurement point. It sometimes happens that the rate of progress among the channels is not all the same. This particular technique allows each channel to be measured at a different measurement point, simultaneously with the other channels at their measurement points, if that is appropriate. That is, each data channel can have its own delay and threshold voltage, independent of those for the other channels. This speeds up the measurement by allowing "overlap," as it were, compared to requiring that all channels be measuring for the same (time, voltage) pair. Thus, each channel's measurement is completed as soon as possible, without slaving intermediate progress for the entire process [start the next (time, voltage) pair] to the channel with the slowest measurement process. To be sure, the entire overall measurement will not be complete until that slowest channel is also completed, but at least the results of the other channels are visible at the earliest possible time, and that may have a bearing on what the operator decides to do. He may determine from an inspection of other results that it is not necessary to wait (perhaps in the minutes, or more) for the measurement on the final channel to be completed.

There is, however, a disadvantage to this technique as set out in "METHOD AND APPARATUS FOR PERFORMING EYE DIAGRAM MEASUREMENTS". The delay lines used are each a tapped series of non-inverting buffers. The input is applied to the start of the tapped series, and the delayed output is taken at the location in the series selected by the tap. It is important to remember that each buffer in the tapped sequence has a frequency response (finite rise and fall times), and that the combined effect for large values of delay (over a thousand buffers in series) is significant. The effective rise and fall time for the stage of delay at the final tap is considerably less than that for any single buffer in the sequence.

Here is why that is important. As will be explained in due course with reference to FIG. 1, consider a (high speed digital) data channel whose signal has rise and fall times that are a significant fraction (say a third, or even more) of the pulse width of that signal. (At, say, ten megahertz we would be justified in considering such a digital signal quite defective. But as for signals in the gigahertz range, we often won't have the luxury of being so fussy, and will have to find a way to cope with signals that are significantly less than perfect. Read on.) The rise and fall time imperfections mean that the width of that data signal at the level corresponding to the threshold varies with the level of the threshold (which would not happen if the data signal had zero rise and fall times and perfectly flat tops and bottoms). Accordingly, the length of the output pulse produced by the threshold comparison varies according to the threshold. For thresholds near (but not above) the upper excursion of the signal the output pulse is "short." Perhaps very short. Even too short. For if it gets short enough it will not make it through the tapped delay line, but will eventually be "swallowed," instead. What comes out of the end of the delay line is a steady level (incorrectly) indicating "no comparison occurred." For thresholds close to (but not below) the lower excursion the comparison pulse width is "long." However, it must be remembered that it is still a periodic signal, which means that when it gets "long" it must also contain a "short" pulse in the other direction corresponding to a brief period of no comparison. Insufficient bandwidth in the delay line can swallow that necessary short separation, so that "long" turns into "too long!" That is, the delayed comparison is no longer responsive to the excursions in the data signal, which is an indication that no change in comparison occurred. Each case (high thresholds, low thresholds) upsets the (delayed) data channel comparison values clocked into the difference detection circuitry (recall the two samples in rapid succession mentioned above, and which if different, indicate a hit). The result is no difference between those samples taken in rapid succession (implying the signal did not passed through the corresponding threshold voltage), which in turn means that for increasing values of data channel delay the EDA exhibits a decreasing sensitivity to both upper and lower thresholds when observing high speed imperfect signals.

So, for example, an eye diagram of several consecutive cycles for such a signal would be made by sweeping the delay from greatest (on the left side of the trace) to least (on the right side). At each step in the delay the amplitude threshold would be swept through its range. The dynamically varying voltage response squashes the trace at locations having the greater delay (on the left, since increased delay is needed in the data path to see earlier times along the time axis). See, in due course, FIG. 2. In the words of one of the inventors: "The resulting eye diagram measurement looks more like a sick worm than an electrical signal." It seems our Eye Diagram Analyzer has turned into a Worm Diagram Generator.

We can't allow rise time imperfections in high speed data signals to generate diagrams of sick worms in our Eye Diagram Analyzer. What to do?

SUMMARY OF THE INVENTION

A solution to the sick worm phenomenon of delay induced apparent amplitude desensitization in an Eye Diagram Analyzer is to alter the measurement technique to avoid the need for any substantial delay in the path of the data channel threshold comparison signals. There are two similar techniques by which this may be accomplished. In the first of these techniques, only enough delay will be inserted in the data channels to produce the relative adjustments needed to compensate for skew between the data channels, as determined by a calibration operation. In this first technique it is these de-skewed, but otherwise un-delayed, data threshold comparison signals that are, in rapid succession, clocked into the latches whose difference registers a hit at a given (time, voltage) pair. The clock path delay is then varied from a minimal value to a sufficiently large value capable of spanning a desired the number of eye diagram cycles. That is, the delay in the de-skewed data channel paths will remain constant, and different (time, voltage) pairs needed for eye diagram production are thus produced by stepping the amount of delay in the clock path. This first technique provides good bandwidth for the data channel comparison signal, and also allows the entire range of relative delay that can be swept with the variable clock path delay. In the second technique, the needed amounts of de-skew delay found by the calibration operation are noted, and then the actual delays in the data path are set back to zero. The clock path delay is swept as in the first technique. This completely maximizes the available bandwidth for the data channel comparison signals, but can be expected to somewhat limit the range of relative delay that can be swept with the variable clock path delay. The de-skewing operation is then performed in post-processing that produces the eye diagram after the measurement is complete. The second technique is presently the preferred one. In either technique, the short width of transitions in the data threshold comparison signals that are associated with threshold values near the extremes of data signal excursion are no longer swallowed by the finite bandwidth of a long delay line, since the delay lines in the data channel paths now either introduce only just enough delay to compensate for skew (and those amounts are very short), or, do not introduce any extra delay at all. The threshold comparison for the clock signal is set at a suitable value at or near the midrange of clock values, and thereafter is not changed. The output pulse from the clock threshold comparator may not have the full width of the clock pulse, but it nevertheless remains robust and constant as it makes its way unhindered through even the full length of the variable tapped delay line within the clock path.

DESCRIPTION OF A PREFERRED EMBODIMENT

Figure 1:
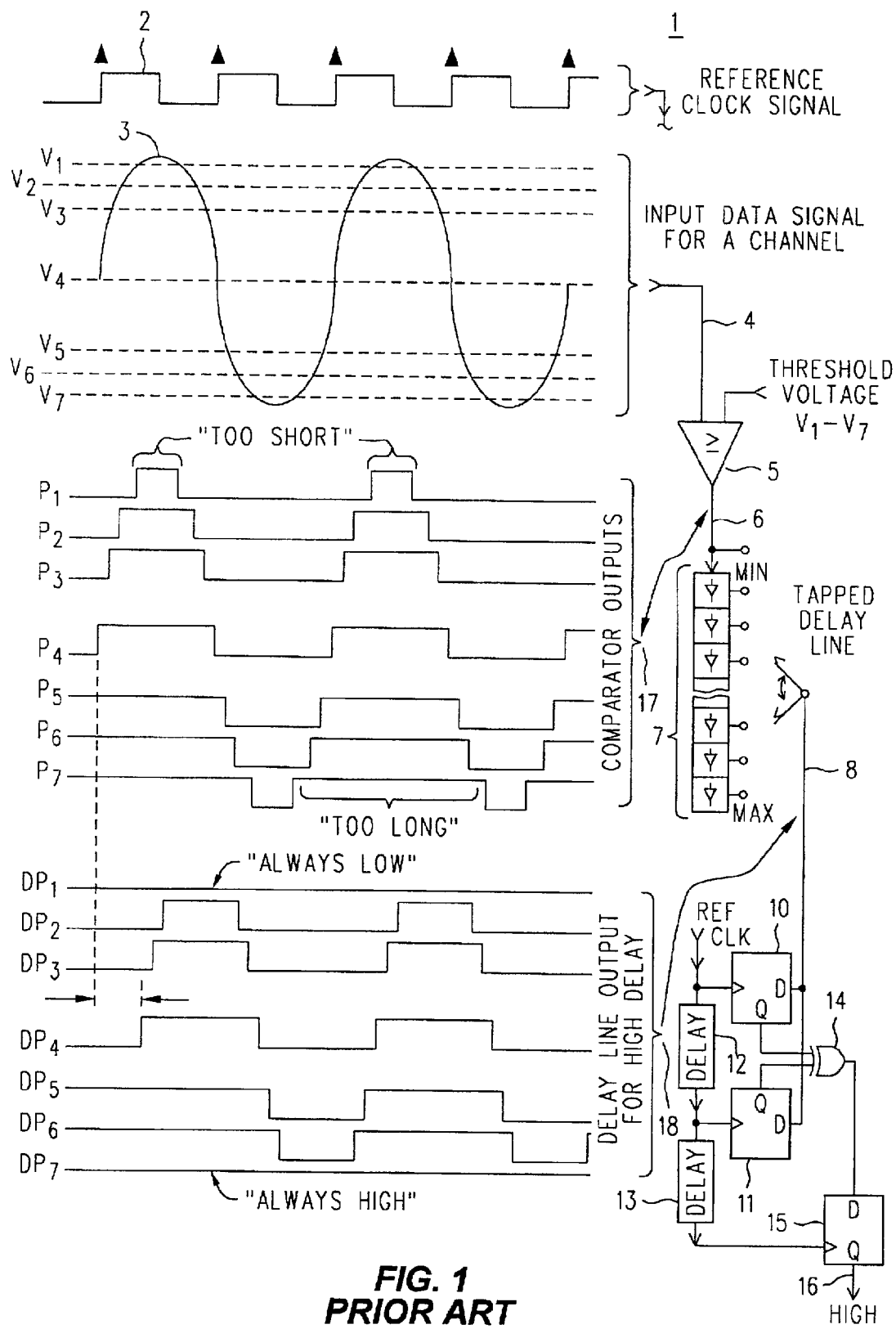
FIG. 1 is a simplified combined waveform & block diagram illustrating the decreasing length of transitions in data channel comparison signals that are associated with comparison thresholds near the extremes of data channel signal excursion, the subsequent loss of the shortest of these transitions during longer delays within a delay line, and how that affects the detection of a hit.

Let us begin by considering the simplified combined waveform & block diagram 1 of FIG. 1. At the top of the figure is shown a Reference Clock Signal 2 upon whose rising edge certain events will be latched or clocked. For our present purposes we may assume that Reference Clock Signal 2 is not the actual SUT clock signal, but a measured version of that which has already been conditioned and sanitized, as needed.

Also shown in FIG. 1 is an Input Data Signal 3 on some channel for which we are to make an eye diagram. Input Data Signal 3 is depicted as having pretty bad rise and fall times. On the other hand, we may assume that it is a very high speed signal, with a period of, say, less than one nanosecond. Input Data Signal 3 is applied as an input 3 to a Comparator 5 that receives, at various times, the threshold voltages $V_1$–$V_7$. We can assume that any given threshold voltage will remain fixed for some length of time, say from a few thousand cycles of Reference Clock Signal 2 to many millions of cycles. We have a shown a comparator of the greater than or equal type. It could as well be of the less than or equal type. The various lengths of its output pulses 6 ($P_1$–$P_7$) are a function not just of the period of the Input Data Signal 3 (which would be the case if it had really short rise and fall times and flat levels therebetween), but are also influenced by the sloping edges of the signal. Notice that more advanced thresholds in either direction produce combinations of increasingly imbalanced long and short duration excursions in the output 6 of Comparator 5. Compare $P_1$ to $P_3$, and $P_7$ to $P_5$. $P_3$ through $P_1$ should be considered nominally low with brief transitions to high, while $P_5$ through $P_7$ should be considered nominally high with brief transitions to low.

For any given threshold these pulse outputs 6 from the Comparator 5 are applied to a variable length Tapped Delay Line 7. The Delay Line 7 may be a tapped series of identical buffers, where each stage of buffering introduces a step of delay. The bandwidth of the buffers in the Delay Line is high, perhaps near the limit of practicality for an integrated circuit application having small steps in overall delay. Even so, at larger delays the effective end to end bandwidth of the Delay Line is significantly degraded. At some increased delay a short pulse like $P_1$ will become too short to pass through the Delay Line 7, and the corresponding delayed signal $DP_1$ (Delayed Pulse One) that will emerge from the Delay Line 7 and be coupled (via 8) to the Transition Detector (10, 11, 14) is always low. $P_1$ has been swallowed. If the delay is long enough, $P_2$ might (owing to further bandwidth reduction) also be swallowed as well, and so on. Corresponding to this, long pulses like $P_7$ can become too long, so that the short transition between their successive instances (they are periodic, remember) is too short (ala $P_1$), and they too, are swallowed. The result is a delayed output $DP_7$ that is always high. It will be appreciated that if the Input Data Signal 3 is symmetrical in its rise and fall time imperfections, then for likewise symmetrically placed threshold voltages $V_1$ and $V_7$, comparison pulses $P_1$ and $P_7$ will be alike in the extent that one is too short and the other too long. That is, it would tend to be the case that $DP_1$ and $DP_7$ are swallowed, or not, as a pair (or nearly so). That however, is a special case requiring a certain symmetry in Input Signal 3, and things are under no obligation to work out that way. This is a long way of saying that the swallowing of $P_3$ . . . $P_1$ and of $P_5$ . . . $P_7$ are independent outcomes. (What this will mean is that the resulting worm diagram, such as that shown in FIG. 2, might be tapered on both the top and the bottom, or on just one thereof.)

To complete our discussion of FIG. 1, we point out exactly how swallowed pulses, such as the missing $DP_1$ and $DP_7$, affect the sampled amplitudes of the Input Data Signal 3. To see this, note that the output 8 of the Tapped Delay Line 7 is applied to the D inputs of the two Latches, 10 and 11. Latch 10 is clocked by the Reference Clock Signal 2, while Latch 11 is clocked by a delayed version of that clock, produced by Delay 12. The Q outputs of those two latches are compared by XOR Gate 14, whose output is clocked into a Latch 15 by a doubly delayed clock signal produced by Delay 13. An output from the XOR Gate 14 indicates that the Input Data Signal transitioned (either way) during the delay produced by Delay Circuit 12. That condition is termed a "hit" and is captured in Latch 15, whose output is a signal HIT 16. Delay Circuit 13 provides set-up time for Latches 10, 11 and XOR Gate 14 to each do their thing before Latch 15 operates.

Such a captured transition (which is stored in a data structure—not shown—indexed or addressed by delay along a time axis and by the threshold voltage) indicates that the Input Data Signal passed through that voltage at about that time. The various combinations of time and voltage thought to be of interest are each tested in turn to fill out the entire data structure. This produces a (large) collection of values for HIT at different (time, voltage) pairs. After the data structure starts to contain data it can be analyzed to allow incremental (partially acquired) eye diagram information to be shown in the display. Those wishing fuller explanation of these various processes can refer to the incorporated "METHOD AND APPARATUS FOR PERFORMING EYE DIAGRAM MEASUREMENTS."

Now for the worm part. The technique described above relies on transition detection to determine that a signal was at about the threshold voltage at the time corresponding to the current delay. If there was no transition, then it seems that the signal did not go there. We have a situation where actual transitions that did occur are not detected (short transitions in the Comparator Output Signal 6 are swallowed by the Tapped Delay Line 7) when the threshold voltage is not exceeded for a long percentage of the signal period, or is only exceeded for a short percentage of the period. These situations are at or near the extreme excursions of the Input Data Signal 3, by an extent determined by how much delay is used (i.e., the amount of reduction in bandwidth) in the Input Data Signal path for that channel. That transitions cease as the Input Data Signal approaches its maximum or minimum value means that the technique does not register or record that those values were reached, when in fact they really were. To examine the data structure, one would think that the cycles of the input signal measured at long delays achieved only lesser excursions, since only those transitions are recorded in the data structure, and none for higher (or lower) threshold voltages. It is a sort of compression.

Now, to create a multi-cycle eye diagram we would ordinarily vary the Input Data Signal delay by whatever amount is needed to cover an amount of time corresponding to the combined periods for those multiple cycles. That can be a lot of delay. The extra bandwidth reduction associated with that delay means a greater tendency for the delay line to swallow the briefest of the transitions in the output 6 of the Comparator 5. Since one end of the diagram has way more delay (less voltage sensitivity) that does the other, the result is a worm diagram (a wrongly tapered eye diagram, or one that is compressed at one end but not the other), as will be seen when we describe FIG. 2.

Figure 2:
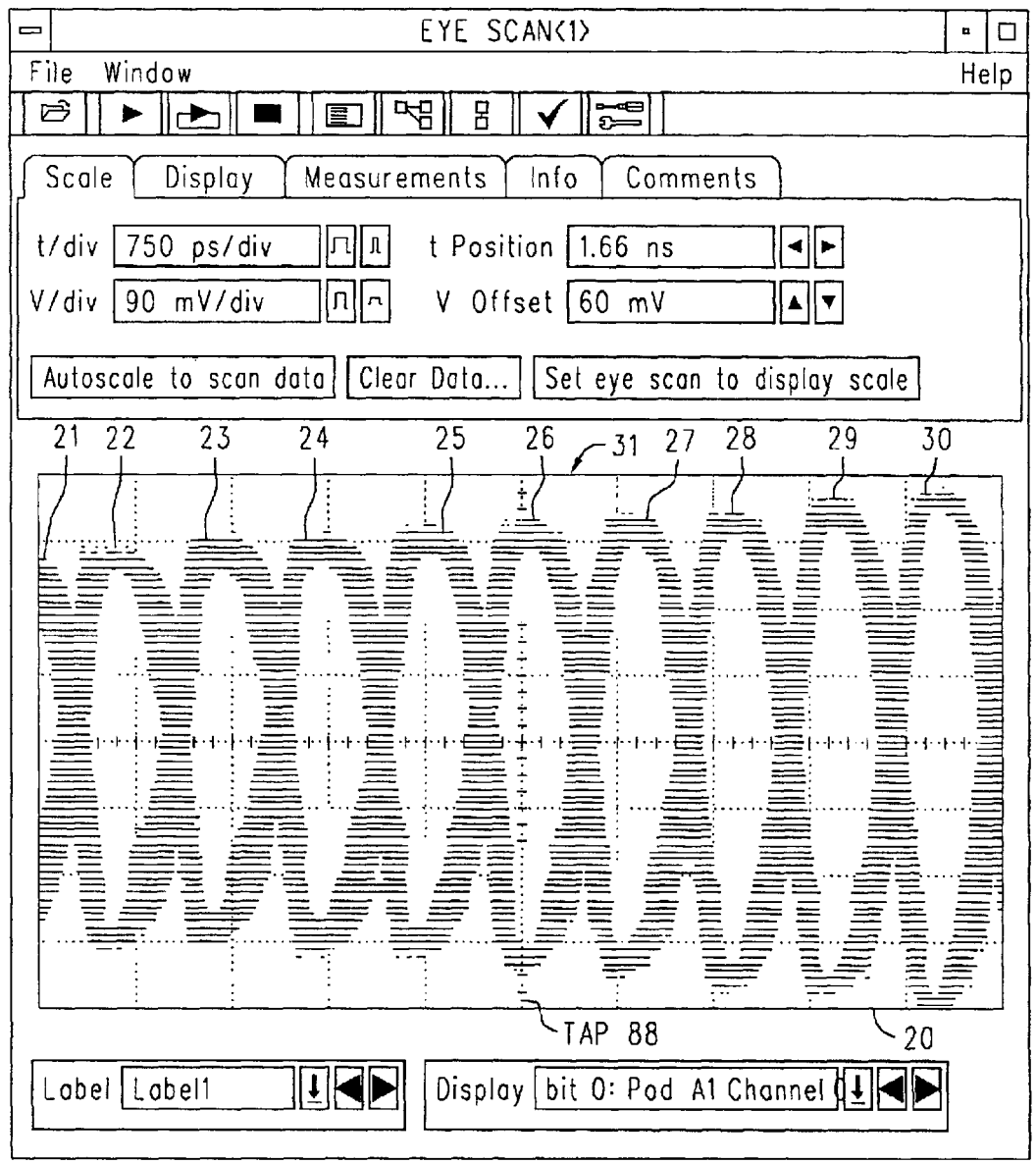
FIG. 2 is an example worm-shaped eye diagram illustrating, for an arrangement such as that of FIG. 1, the apparent loss of amplitude sensitivity for the voltage co-ordinates of sampled (time, voltage) pairs with the increasing delay introduced to vary the time co-ordinate.

Refer now to FIG. 2, which is a multi-cycle eye diagram display 19 presented in a window 20. There are about nine and one half individual eye diagram cycles 21–30 that have experienced increasing amounts of voltage compression toward the left side, owing to the increased data channel delay used to gather (time, voltage) pairs for the left side of the diagram. The condition of zero delay relative to the reference is somewhat beyond the right edge of the of the trace (the trace has been panned to the left), and all visible cycles have increasing amounts of data channel delay as we go further to the left.

In this example the data channel delay line has taps zero through one thousand twenty-three, of about 11.7 picoseconds per tap, and very nearly sixty-four taps per division in the diagram. The way this particular example is arranged, the far left of the diagram used tap one thousand twenty-three, the vertical graticule line 31 at the horizontal middle of the diagram corresponds to tap number seven hundred and three, and the far right edge of the diagram corresponds to tap number three hundred and eighty-three. (The condition of zero relative delay is not actually tap zero, since some starting point is found during an initial calibration operation where extra internal delays in the clock path are canceled by inserting corresponding delay in the data path.)

The voltage sensitivity is nominally 90 mv/div, and a definite difference of nearly a quarter of a volt peak-to-peak can be seen between cycle 21 and cycle 30. This displayed voltage difference is incorrect, however, as the signal used to create this data had no such variation in amplitude. It did have variations in amplitude of about forty millivolts, as indicated by the "thickness" of the trace. But there is no reasonable interpretation that can be enforced to explain how a signal could have actual behavior that would produce the tapered eye diagram of FIG. 2.

Figure 3:
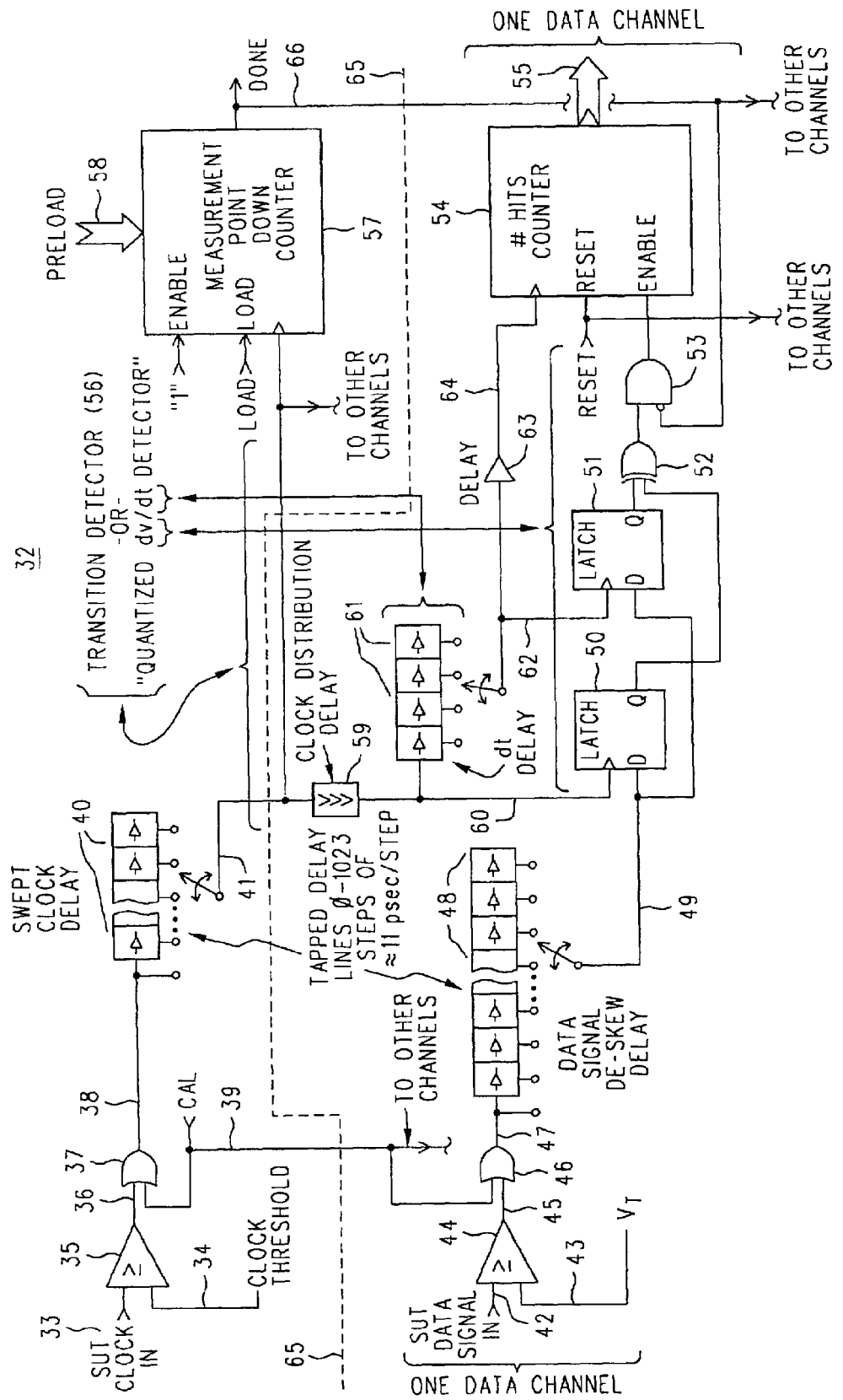
FIG. 3 is a simplified block diagram of an eye diagram measurement system constructed and operated in accordance with the principles of the invention, and which is "worm free."

Refer now to FIG. 3, which is a simplified block diagram 32 of the measurement hardware associated with each SUT data signal that can be the subject of an eye diagram measurement. What is shown in the figure is one SUT clock section above dotted line 65 and one SUT data signal section below dotted line 65. This would accommodate a single channel measurement. It will be appreciated that for additional channels there would remain the single SUT clock section, while additional corresponding data signal sections would be added, one for each channel. In connection with this, we have shown certain signals (a RESET, DONE, CAL and a delayed clock) that are sent to any additional data signal channels.

The SUT Clock Input 33 is applied, along with a Clock Threshold voltage 34, to the inputs of a Comparator 35. The nature of the Comparator 35 is that it produces an output 36 whenever the SUT Clock Input 33 is greater than or equal to the Clock Threshold voltage 34. The operator can specify the Clock Threshold voltage. It will typically be set at or near the middle of the excursion of the SUT Clock Input signal 33.

In similar fashion, the SUT Data Signal Input 42 is applied, along with a (possibly channel specific) data threshold voltage $V_T$ 43, to the inputs of a Comparator 44. The nature of the comparator is that it produces an output 45 whenever the SUT Data Signal Input 42 is greater than or equal to the threshold voltage $V_T$ 43. The operator can specify the range over which the threshold voltage $V_T$ will be varied.

In a preferred embodiment all this circuitry is implemented within an IC. The effective values of the thresholds, as well as those of the various to delays to be encountered, are somewhat a function of temperature and other causes of drift, which manifest themselves as skew between the data channels. To minimize the mischief caused by such drifts we prefer to frequently adjust the variable delays (to be discussed below) to produce an indication of simultaneity (zero relative delay, or no skew) under an imposed controlled condition. That controlled condition is that comparator output signals 36 and 45 transition at the same time. Rather that disturb the circuitry of the comparator (which is practical) we show OR gates 37 and 46 that allow a CAL signal 39 to accomplish the same effect. So, at the start of each run we arrange that the two Comparators 35 and 44 will not otherwise produce an output (very high thresholds, remove an ENABLE signal or turn off something upstream in the signal paths, etc.) and apply a suitable square wave CAL signal 39. We do that continuously until some adjustment (described in due course) produces a satisfactory result (a close approximation of zero relative delay).

It will be noted that this choice of location for applying a common signal for determining/compensating skew amongst the data channels ignores the probes and cabling between the probes and the comparators. Testing has shown that this is permissible in the actual instrument, since the probes themselves contain only resistive de-coupling networks and the cabling is ribbonized coax whose length is controlled at the time of manufacture. It thus turns out that the contribution to skew from the probe block and its cable are quite small, and are absorbed into the overall error specifications.

To continue, then, the output of OR gate 37 is signal 38, which is applied to a Swept Clock Delay circuit 40. We have shown this circuit 40 as though it were a cascaded series (say, one thousand twenty-three in number) of non-inverting buffers whose input and series of successive outputs are selected by a switch (as in a MUX) to become a variably delayed version 41 of the input. Each buffer has the same delay, which is somewhere in the ten to twelve picosecond range. Let us call the delayed output a partially delayed clock signal.

Since there is to be but one clock signal for however many data channels are involved, the output 41 from the Swept Clock Delay circuit 40 must be distributed to the vicinity of the data signal hardware (the stuff below line 65) for those however many channels, some of which may be in different ICs or on different printed circuit assemblies. The significance of this is that there are different delays in getting the partially delayed clock signal 41 to where its needed within each channel. We represent this by the box 59 labeled Clock Distribution Delay. The output of box 59 (there is no lumped delay there—the lumped delay is an equivalent to the distributed delay that is real, but awkward to show) might be termed the real delayed clock signal. It is the case that the Clock Distribution Delay is not the same amount for each channel, but they are within, say, five percent of each other. So, the various 'real delayed clock signals' are not truly simultaneous, but we can live with that, since it is going to turn out that we need to zero, within each channel, for the relative delay between that channel and its version of the clock, but do not need to zero for true simultaneity across all the various channels.

Return now to the data signal path below line 65, which, it will be recalled, is an instance for one channel out of several. The output 47 of OR gate 46 is applied to another tapped delay line (Data Signal De_Skew Delay) 48 that is of the same nature as the Swept Clock Delay circuit 40. Its output 49 is applied to the D input of a Latch 50 that is clocked by that channel's real delayed clock signal 60.

Before proceeding, let's pause a moment and take care of the CAL/de-skew operation. After that it will make sense to describe how the tap settings for the two delay lines 40 and 48 are selected for a run. Assume now that the CAL signal (a square wave of convenient frequency) is present. Let the Swept Clock Delay circuit 40 be at some tap. Now, considering the Clock Distribution Delay for each channel, it is possible to adjust the Data Signal De-Skew Delay circuit 48 so that Latch 50 has a stable number of equally distributed different values about one setting of the tap for the Data Signal De-Skew Delay circuit 48. We'd like that tap (in 48) to be at about the start of the one thousand twenty-four possible positions, so we vary the tap for the Swept Clock Delay circuit 40 to get the taps for the various different instances of circuits 48 to be at about their starting locations when their associated Latch 50's are behaving as described above. This provides the information needed for de-skewing, as between the various channels, and depending upon how we implement the de-skewing, allows us to maximize the subsequent range of variability for each channel during a measurement proper, and eliminate the effects of data channel bandwidth on the data channel comparator pulse.

The following situation describes one way that we might proceed. We actually leave the Data Signal De-Skew Delay circuits set at their positions found above. This might be termed a genuine hardware implemented de-skew. There are likely several (or a great many) data channels in use, so they won't be all at the same tap, since the various associated Clock Distribution Delays are likely all somewhat different. The effect of this will be that not every data channel will have the greatest possible bandwidth, but the reductions are relatively slight, so it works anyway. This mode of operation (genuine hardware de-skew) affords a full range of swept clock delay.

Another way to proceed, and this is preferred, is to make note of the delays needed to accomplish de-skewing, store them for later use by the software that generates the eye diagram, and then set the Data Signal De-Skew Delay circuits 48 back to no delay whatsoever. This technique, which we may call post processing de-skew, has the advantage of eliminating altogether the effects of data channel bandwidth on the data channel comparator pulses, but at the cost of a slight reduction in the range of relative delay that can be introduced by subsequently varying the delay provided by the Swept Clock Delay circuit 40. This reduction arises because each channel will typically require a different offset from the clock to operate in a de-skewed fashion. This means that for each channel to have a full range of swept clock delay those clock ranges, when placed on a common time axis, would have ragged edges at both the upper and lower values of delay. The ragged edges would match the variations needed for de-skewing the data channels. But there is only one range for clock delay produced by the single Sept Clock Delay circuit 40, so the effective range of swept delay for the collection of data channels is that portion that is common to all channels. That is, the ragged edges must be trimmed away, so to speak, since if we were to operate in the range of those ragged edges some channels would be left out. Thus it is that the range of variable swept clock delay that can be implemented with the post processing de-skew technique is somewhat reduced.

To resume the discussion of how to make a run, each channel further delays its copy of the real delayed clock signal 60 to produce a doubly delayed clock signal 62. This is accomplished by a dt Delay Circuit 61 of, say, four tapped delays of 70 ps, 120 ps, 170 ps and 220 ps. The doubly delayed clock signal 62 clocks a Latch 51 whose D input is also the (same) delayed data signal applied to Latch 50. The idea is that if the two Latches 50 and 51 have different values (detected by XOR gate 52) after both have been clocked, then the SUT Data Input Signal 42 must have transitioned through $V_T$ sometime during the interval between when Latch 50 was clocked and Latch 51 was clocked. (We called that time interval dt in connection with FIGS. 1 and 3 of the incorporated "METHOD AND APPARATUS FOR PERFORMING EYE DIAGRAM MEASUREMENTS.") The value of dt is the delay provided by the dt Delay Circuit 61.

It will be recalled (from "METHOD AND APPARATUS FOR PERFORMING EYE DIAGRAM

MEASUREMENTS") that dt is a sampling window in time whose location is at an offset $T_{SAMP}$ from $T_0$. (See FIG. 3 of "METHOD AND APPARATUS FOR PERFORMING EYE DIAGRAM MEASUREMENTS.") It will now be appreciated that $T_0$ is the CAL condition we set out above (zero relative delay between the signals 49 and 60), and that by varying the tap of the Swept Clock Delay circuit 40 in the direction of increasing delay we create increased amounts of time in the (time, voltage) pairs needed for the eye diagram measurement.

For both the genuine hardware and post processing de-skew techniques: after calibration and during a run, we leave the values for the taps of the various Data Signal De_Skew Delay circuits (48) unaltered while the Swept Clock Delay circuit 40 is swept through its range of values. Since the data channels are all at zero or minimal delays, they do not swallow the short comparator transitions that accompany setting the threshold voltage $V_T$ near the extremes of SUT DATA Signal (42) excursion. That is, we get a proper eye diagram and not a worm diagram.

The output of XOR gate 52 is applied, through AND gate 53, to an ENABLE input of a # Of Hits Counter 54, which may be reset at the beginning of each run. The # Of Hits Counter 54 is clocked (made to count if enabled) by a signal 64 that is a delayed (by Delay Circuit 63) version of the doubly delayed clock signal 62. The extra delay 63 allows Latch 51, XOR gate 52 and AND gate 53 to get set up (which, if it happens, enables the counter 54 to count).

The run continues until enough SUT clock cycles have been examined. That number is determined by a value 58 that is pre-loaded into a Measurement Point Down Counter 57 at the start of the run. Each SUT clock cycle decrements the pre-loaded count by one. When it reaches zero a signal DONE 66 is generated, which, among other things signals the EDA system supervisor that the run is complete and removes the ability to enable the # Of Hits Counter 54.

At this time the value 55 accumulated in the # Of Hits Counter 54 is stored by the EDA system in the indexed location of the data structure, along with any other information deemed useful, such as the value 58 of the pre-load for counter 57. It will be noted that the block diagram 32 suggests that this happens in an instance by instance manner. It will also be appreciated, however, that while the block diagram gives the proper functionality to be obtained, it is often desirable for performance reasons to employ additional techniques such as pipelines, parallelism and MUX'ing of cached results to 'get things to run faster than they really do'.

After each run a new (time, voltage) pair is instituted, and another run conducted, until there have been as many runs as needed, or the operator manually indicates that the measurement should be terminated.

Finally, those who compare what is set out in the incorporated "METHOD AND APPARATUS FOR PERFORMING EYE DIAGRAM MEASUREMENTS" and what is described herein will note that there is a definite similarity between the FIG. 4 of the incorporation and the instant FIG. 3. However, it will also be appreciated that manner in which the clock path and data path delay lines are used is entirely different. The technique of the incorporation sweeps the data channel delay, while we sweep the clock channel delay. That similarity is, however, a useful versatility to have in an Eye Diagram Analyzer, as it allows it to operate according to either technique, depending upon the application at hand.

We claim:

1. A method of measuring a data signal to create an eye diagram of that signal, the method comprising the steps of:

(a) setting a hits count to zero;

(b) comparing the instantaneous voltage of a clock signal associated with the data signal to a clock threshold voltage to produce a logical clock signal;

(c) delaying the logical clock signal by a variable first amount to produce a variably delayed logical clock signal;

(d) comparing the instantaneous voltage of the data signal to be measured to a data threshold voltage to produce a logical data signal;

(e) delaying the logical data signal by an adjustable second amount to produce a de-skewed logical data signal;

(f) delaying the variably delayed logical clock signal by a selected third amount to produce a doubly delayed logical clock signal;

(g) capturing the value of the de-skewed logical data signal in response to the delayed logical clock signal;

(h) capturing the value of the de-skewed logical data signal in response to the doubly delayed logical clock signal;

(i) incrementing the hits count each time a value captured in step (g) is different from that captured in step (h);

(j) repeating steps (b) through (i) until a selected condition is satisfied;

(k) subsequent to step (j), storing the count of step (i) in a data structure indexed by the difference between the first and second amounts and by the data threshold voltage;

(l) repeating steps (a) through (k) with different combinations of the data threshold voltage and values of the variable first amount; and (m) generating an eye diagram from the hits counts stored in the data structure.

2. A method of measuring a data signal to create an eye diagram of that signal, the method comprising the steps of:

(a) setting a hits count to zero;

(b) comparing the instantaneous voltage of a clock signal associated with the data signal to a clock threshold voltage to produce a logical clock signal;

(c) delaying the logical clock signal by a variable first amount to produce a variably delayed logical clock signal;

(d) comparing the instantaneous voltage of the data signal to be measured to a data threshold voltage to produce a logical data signal;

(e) performing instances of step (b), (c) an (d) with a calibration signal supplied in place of the clock signal and the data signal;

(f) delaying the logical data signal by an adjustable second amount adjusted such that step (d) produces a de-skewed logical data signal;

(g) saving in a memory location the value of the adjustable second amount producing a de-skewed logical data signal;

(h) subsequent to step (f), setting the adjustable second amount to a minimal amount, such that subsequent instances of step (d) produce a skewed logical data signal;

(i) delaying the variably delayed logical clock signal by a selected third amount to produce a doubly delayed logical clock signal;

(j) capturing the value of the skewed logical data signal in response to the delayed logical clock signal;

(k) capturing the value of the skewed logical data signal in response to the doubly delayed logical clock signal;

(l) incrementing the hits count each time a value captured in step (j) is different from that captured in step (k);

(m) repeating steps (b) through (l) until a selected condition is satisfied;

(n) subsequent to step (m), storing the count of step (l) in a data structure indexed by the difference between the first and second amounts and by the data threshold voltage;

(o) repeating steps (a) through (n) with different combinations of the data threshold voltage and values of the variable first amount; and (p) generating a de-skewed eye diagram from the hits counts stored in the data structure and the values saved in step (g).

3. A method of measuring a data signal to create an eye diagram of that signal, the method comprising the steps of:

(a) setting a hits count to zero;

(b) comparing the instantaneous voltage of a clock signal associated with the data signal to a clock threshold voltage to produce a logical clock signal;

(c) delaying the logical clock signal by a variable first amount to produce a variably delayed logical clock signal;

(d) comparing the instantaneous voltage of the data signal to be measured to a data threshold voltage to produce a logical data signal;

(e) performing instances of step (b), (c) an (d) with a calibration signal supplied in place of the clock signal and the data signal;

(f) delaying the logical data signal by an adjustable second amount adjusted such that step (d) produces a de-skewed logical data signal;

(g) saving in a memory location the value of the adjustable second amount producing a de-skewed logical data signal;

(h) subsequent to step (f), setting the adjustable second amount to a minimal amount, such that subsequent instances of step (d) produce a skewed logical data signal;

(i) delaying the variably delayed logical clock signal by a selected third amount to produce a doubly delayed logical clock signal;

(j) capturing the value of the skewed logical data signal in response to the delayed logical clock signal;

(k) capturing the value of the skewed logical data signal in response to the doubly delayed logical clock signal;

(l) incrementing the hits count each time a value captured in step (j) is different from that captured in step (k);

(m) repeating steps (b) through (d) and (h) through (l) until a selected condition is satisfied;

(n) subsequent to step (m), storing the count of step (l) in a data structure indexed by the difference between the first and second amounts and by the data threshold voltage;

(o) repeating steps (a) through (n) with different combinations of the data threshold voltage and values of the variable first amount; and (p) generating a de-skewed eye diagram from the hits counts stored in the data structure and the values saved in step (g).

4. An eye diagram analyzer comprising:

a clock signal threshold detector having a threshold, an input for receiving a clock signal and having an output producing a logical clock signal;

a variable clock signal delay circuit having an input coupled to receive the logical clock signal and an output producing a variably delayed logical clock signal;

a first data signal threshold detector having a variable threshold, an input for receiving a first input data signal to be measured as an eye diagram and having an output producing a first logical data signal;

a first data signal de-skewing circuit having an input coupled to receive the first logical data signal and an output producing a de-skewed first logical data signal;

a first transition detection circuit coupled to the variably delayed logical clock signal and to the de-skewed first logical data signal, and having an output producing a first transition signal indicative of a transition in the de-skewed first logical data signal occurring during a selected length of time subsequent to a transition in the variably delayed logical clock signal;

a first counter coupled to the first transition signal and that counts occurrences thereof;

a second data signal threshold detector having a variable threshold, an input for receiving a second input data signal to be measured as an eye diagram and having an output producing a second logical data signal;

a second data signal de-skewing circuit having an input coupled to receive the second logical data signal and an output producing a de-skewed second logical data signal;

a second transition detection circuit coupled to the variably delayed logical clock signal and to the de-skewed second logical data signal, and having an output producing a second transition signal indicative of a transition in the de-skewed second logical data signal occurring during the selected length of time subsequent to a transition in the variably delayed logical clock signal;

a second counter coupled to the second transition signal and that counts occurrences thereof; and a memory whose content is organized as a data structure indexed by the amount of delay for the variable clock signal delay circuit and by the variable thresholds for the first and second data threshold detectors, and that stores in indexed locations the numbers of occurrences counted by the first and second counters.

* * * * *